United States Patent
Kolawa et al.

(10) Patent No.: US 8,732,676 B1
(45) Date of Patent: May 20, 2014

(54) SYSTEM AND METHOD FOR GENERATING UNIT TEST BASED ON RECORDED EXECUTION PATHS

(75) Inventors: Adam K. Kolawa, Bradbury, CA (US); Marek Kucharski, Cracow (PL)

(73) Assignee: Parasoft Corporation, Monrovia, CA (US)

( * ) Notice: Subject to any disclaimer, the term of this patent is extended or adjusted under 35 U.S.C. 154(b) by 1040 days.

(21) Appl. No.: 12/202,009

(22) Filed: Aug. 29, 2008

Related U.S. Application Data

(60) Provisional application No. 60/968,838, filed on Aug. 29, 2007.

(51) Int. Cl.
*G06F 9/44* (2006.01)

(52) U.S. Cl.
USPC .......................... 717/132; 717/131

(58) Field of Classification Search
None
See application file for complete search history.

(56) References Cited

U.S. PATENT DOCUMENTS

| | | | |
|---|---|---|---|
| 5,050,168 A * | 9/1991 | Paterson | 714/35 |
| 6,085,029 A * | 7/2000 | Kolawa et al. | 714/38.13 |
| 6,308,321 B1 * | 10/2001 | Schooler | 717/132 |
| 6,668,372 B1 * | 12/2003 | Wu | 717/130 |
| 6,848,100 B1 * | 1/2005 | Wu et al. | 717/157 |
| 6,959,431 B1 * | 10/2005 | Shiels et al. | 717/124 |
| 7,908,590 B1 * | 3/2011 | Min et al. | 717/124 |
| 2002/0035722 A1 * | 3/2002 | McKinsey et al. | 717/5 |
| 2003/0070117 A1 * | 4/2003 | Matsuki et al. | 714/25 |
| 2003/0226060 A1 * | 12/2003 | Das et al. | 714/38 |
| 2005/0120276 A1 * | 6/2005 | Kolawa et al. | 714/38 |
| 2005/0223361 A1 * | 10/2005 | Belbute | 717/124 |
| 2006/0064682 A1 * | 3/2006 | Tanaka | 717/161 |
| 2007/0016894 A1 * | 1/2007 | Sreedhar | 717/131 |
| 2007/0033443 A1 * | 2/2007 | Tillmann et al. | 714/45 |
| 2008/0082968 A1 * | 4/2008 | Chang et al. | 717/128 |
| 2008/0256517 A1 * | 10/2008 | Atkin et al. | 717/124 |

* cited by examiner

*Primary Examiner* — Li B Zhen
*Assistant Examiner* — Viva Miller
(74) *Attorney, Agent, or Firm* — Christie, Parker & Hale, LLP

(57) ABSTRACT

A method and system for testing a computer software system based on execution paths including: executing the computer program to obtain an execution path in the computer software; recording the execution path; modifying variables in the recorded execution path to create one or more perturbed paths; analyzing the one or more perturbed paths to detect potential errors; and generating unit tests for the one or more perturbed paths having the detected potential errors. The created test units may then be executed to test the computer software.

10 Claims, 6 Drawing Sheets

SYSTEM AND METHOD FOR GENERATING UNIT TEST BASED ON RECORDED EXECUTION PATHS

CROSS-REFERENCE TO RELATED APPLICATION

This Patent Application claims the benefits of U.S. Provisional Patent Application Ser. No. 60/968,838, filed on Aug. 29, 2007 and entitled "SYSTEM AND METHOD FOR GENERATING UNIT TEST BASED ON RECORDED EXECUTION PATHS," the entire content of which is hereby expressly incorporated by reference. This Patent application is also related to U.S. patent application Ser. No. 11/557,454, filed Nov. 7, 2006, and entitled "System and Method for Detecting Defects In A Computer Program Using Data And Control Flow Analysis," the entire content of which are hereby expressly incorporated by reference.

FIELD OF THE INVENTION

The present invention relates to testing of a computer software system. More specifically, the present invention is directed to a method and system for generating unit test, based on execution paths.

BACKGROUND OF THE INVENTION

One measure of computer code coverage to cover all pieces of the code during testing process is line coverage or decision coverage. Line coverage counts lines of a code which were executed and compares against all lines of the code. Decision coverage counts decisions taken during execution of decision points like, "if" statements. However, even this enhanced measure may not sufficiently cover the entire code and scenarios. The combined lines executed and decisions taken formulate an execution path. One decision point with two possible decisions formulates two execution paths. But, two independent decision points with two possible decisions each formulate potentially up to four possible execution paths, for example, (decission1.1, decission2.1), (decission1.1, decision2.2), (decision1.2, decision2.1) and (decision1.2, decision2.2).

It is not uncommon that a defect reveals itself only on one execution path, while the rest of the execution paths remain correct. Executing each and every path in a testing environment is virtually impossible since the execution paths depend, not only on user driven actions, but also on environment, external conditions (e.g., given status of network connection), network traffic, state of a database, memory size, and the like. Emulating all such conditions is extremely time and resource consuming.

Therefore, testing is sometimes extended with static analysis of extracted execution path. Execution paths are extracted during parsing process. Then, Control Flow Graphs (CFGs) and/or Data Flow Graphs (DFGs) are created. A code analyzer then attempts to follow the created CFGs and DFGs and detect defects. Reducing a problem to isolated, independent execution paths makes such analysis feasible. The problem with this approach is that the number of paths in a computer program is in the order of $2^N$, where N is number of decision points, which in turn is proportional to the number of lines of code. Therefore, the analysis becomes impractically computational intensive. As a result, this approach is impractical in large systems. There is a need to reduce the complexity of the analysis to a size which is in order of N to make the analysis practical for commercial systems in which N can be as large as 1,000,000.

Another approach to the problem described above is to limit analyzed path length to some arbitrary number of steps. This approach however may rule out paths which contain serious problems but take more steps than the imposed limit.

Another drawback of existing methods for automatically generated unit test cases is the fact that they very seldom represent a real program execution situation or environment. That is, variables are not independent, and cannot get any value, that is, on a given execution path, given variables cannot get any arbitrary value. For example for the statement "if (b<0) {b=a+1}", the variable b cannot take any value after the statement is executed. On one path, b cannot be less then 0, on another path (b was less then 0), b becomes related to the value of variable a. Additionally, having test cases generated only from recorded variables will not give good code coverage with test cases.

However, not every path in the computer application (although possible from the code construction point of view) is actually executed in the real life application operation environment. Therefore, the number of paths to analyze can be effectively reduced significantly, if there would be a way to determine which paths can be actually executed, and which cannot. Such statement can be translated into execution probability.

SUMMARY

In some embodiments, the present invention is a method and system for testing a computer software system based on execution paths. The method and system include: executing the computer program to obtain an execution path in the computer software; recording the execution path; modifying variables in the recorded execution path to create one or more perturbed paths; analyzing the one or more perturbed paths to detect potential errors; and generating unit tests for the one or more perturbed paths having the detected potential errors. The created test units may then be executed to test the computer software.

In some embodiments, the recorded path information may include information about which lines in the computer code were executed and information about variable values at a given path stage. A pattern recognition analysis tool may also be used with a set of pattern recognition rules on the perturbed paths for further verification of the computer program.

DETAIL DESCRIPTION

Figure 1:
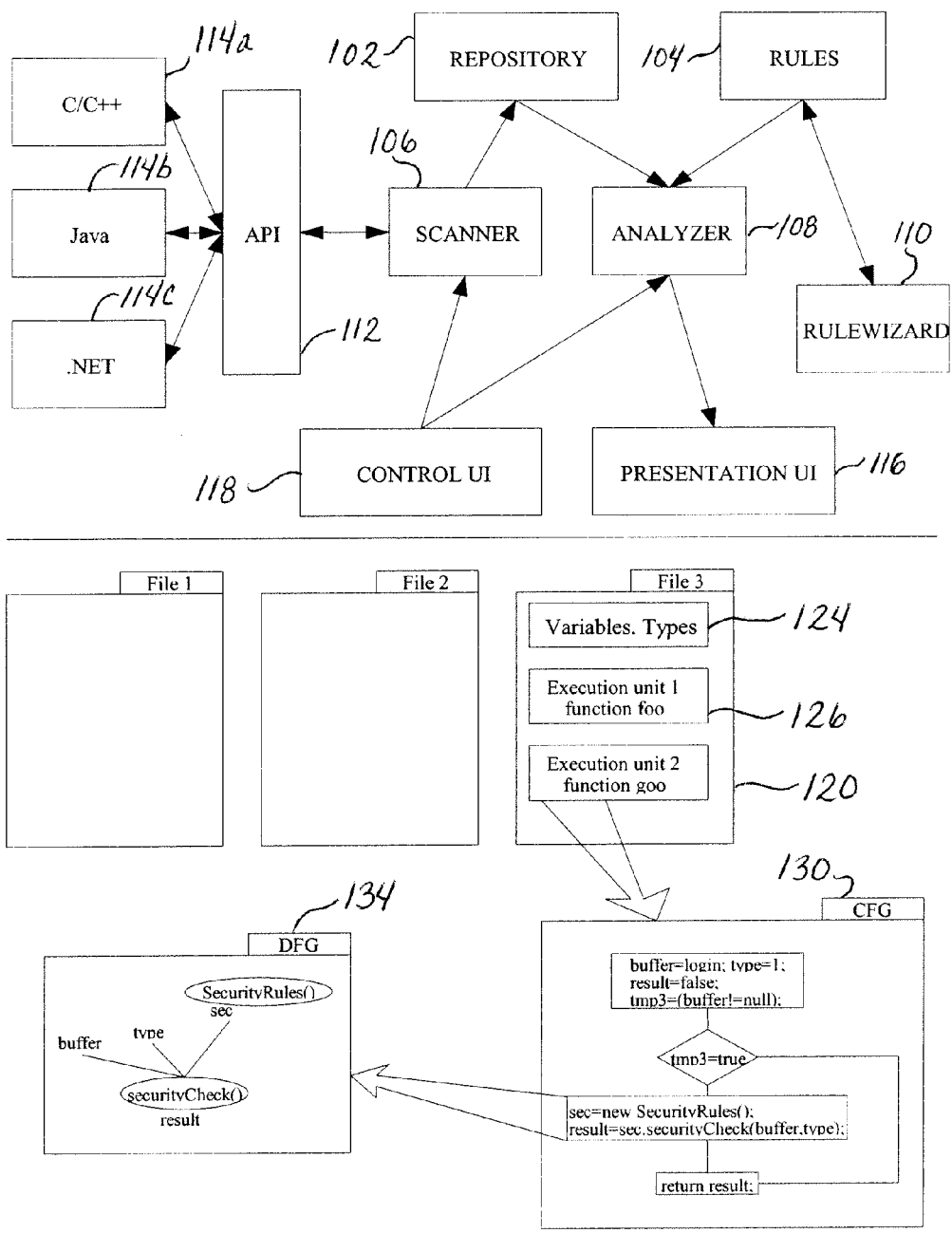
FIG. 1 is an exemplary system diagram, according to one embodiment of the present invention.

In some embodiments, the present invention examines only paths with high execution probability and ignores those with low execution probability. To determine which paths have high execution probability, the method and system of the invention assumes that such paths are not very distinct from other paths with high execution probability. In particular, having a path which was actually executed within the application, the paths which can be obtained by small modifications/perturbation to the executed path should have high execution probability. Having a recorded execution path, an analyzer can traverse it and in each decision take different execution branch, one at a time. In other words, if a decision point A was modified from a recorded execution path, the execution flow is then traced from that point but, without taking all possible paths.

To further validate execution paths obtained by perturbing an existing execution path, the method and system of the present invention then generate one or more unit test cases to examine/test the paths obtained by perturbation. In other words, the invention applies a linear method of analysis for determining realistic path candidates based on perturbing the executed path, for possible errors. Since the recorded path (both the executed path and the perturbed path) contains variables and their values taken from a real program execution, the variables and their values can be taken to generate unit test cases. Such generated test cases would represent a highly probable situation. The graphs along function invocations of the recorded execution path can be expanded to obtain an elementary path from the recorded execution path. In some embodiments, the linear method of analysis includes starting at any point in a perturbed path and traversing in a forward or backwards direction through a corresponding execution path.

A perturbed path is generally derived from a recorded actual executed path by slight modifications of data involved in a decision point. For example, if a decision point is: "if x<5 then A else B," a value of variable x determines whether execution goes through point A or through point B. let's assume that while the computer program was executed, it had a value of 3 at point x. As a result, the recorded path was going through A. To obtain a perturbed path, x is modified and increased by 2 to reach a value of 5. Then execution would go through B instead of A. Therefore, by changing the value of x from 3 to 5, a different path was created from the original recorded path, that is a perturbed path.

A recorded path is a path that is tracked and recorded during computer program execution. For example, a user may hit a button, which causes program to traverse certain paths through out the computer program code. That may result in opening an editor tool, submitting a form, performing some calculations, or some other actions. All machine instructions performed after such event, until the computer program returns to idle waiting for another event, constitute an execution path. Such path can be tracked and recorded in the form of list(s) of files, lines executed, and all involved data values.

In one embodiment, the present invention is a method and system for determining and recording computer program execution paths, storing (recording) them and efficiently analyzing them for generating unit tests based on the recorded (stored) paths. The method and system provide an Application Programming Interface (API), which allows for plugging various programming language specific front ends. The system also includes a storage mechanism for determined execution paths, a framework under which various concrete analysis algorithms such as, verification tools (for example, a pattern recognition tool/algorithm) can be used on the stored execution paths. The system further includes pattern recognition rules that enforce defect detection, a set of rules that are enforced to avoid possible execution errors, and a presentation layer. The method and system also provide a mechanism to create custom rules to be enforced on detected execution paths.

In one embodiment, the present invention is a software application for determining, storing and analyzing control flow graphs and data flow graphs and based on those graphs, generating unit tests to test the most realistic paths. The software application includes: a language specific front end in a form of a source code parser, an intermediate language parser or the like. The software application also includes: an API for retrieving and representing important information about control flow, data flow, variables, types, functions, and the like; a scanner for scanning files in a project and retrieving required information to populate a repository using the API.

The repository is responsible for collecting information about execution paths in a project. The repository is also responsible for optimizing access to the information. An analyzer is the framework for various analyzing algorithms. An analysis or verification tool, such as a pattern recognition tool, uses rules from a variety of rule sets to recognize certain patterns in the flow graphs that violate the rules under enforcement. Other analysis/verification tools can be easily plugged in utilizing repository features for additional path filtering or defects detection.

A software tool for rule creation, such as Rule Wizard™ from Parasoft™ Corporation which presents rules graphically, allows for rule customization and rule addition. Rules are stored in proprietary formats or open formats like, XML, UML, or the like. A control User Interface (UI) drives the scanner and the analysis routines and provides configuration. A presentation UI presents analysis results to the user.

FIG. 1 is an exemplary system diagram, according to one embodiment of the present invention. A language specific front end 114 analyzes files with source code, byte code, or intermediate language. For example, this can be a C++ parse tree 114a, a Java parse tree 114b, a .NET parse tree 114c, or any other programming language which can be represented as a parse tree. This front end also provides API implementation.

An API 112 retrieves information about control flow, data flow, variables, types, functions, and the like. A scanner 106 utilizes the API 112 to scan files 120 in a project and retrieves required information to populate a repository 102.

The repository 102 collects information about files 120 in a project. This repository is also responsible for optimization and access to the optimization information and information like Control Flow Graphs (CFG) 130 and/or Data Flow Graphs (DFG) 134 for a given function, and all implementations of a given virtual function.

An analyzer 108 is a framework for various analyzing processes. The analyzer can use rules from various rules sets to analyze (or recognize) certain patterns in the flow graphs which violate rules under enforcement. Other processes can be easily plugged in utilizing the Repository features for defects detection.

A sets of rules 104 to be enforced by the analyzer 108 are available. A rule creation tool 110 such as, Rule Wizard™ that presents rules graphically and allows for rules customization and addition can be used with the present invention. Created rules may be stored in a proprietary format or open format like, XML, UML, and the like.

In one embodiment, the repository includes:

A storage subsystem in the form of a relational database, hierarchical database, set of disc files, or other persistent storage mechanism.

An access optimization subsystem in the form of caches, indexes and so on for fast, optimized access to stored flow graphs, methods, types, etc.

A path creation subsystem which allows to expand graphs along function invocations so that the stored paths are elementary (meaning that the paths cannot be further replaced with more detailed graphs) and the analyzer can further expand graphs on demand. For example, on a graph, a function invocation is represented as a single node. But actually something is happening inside the function. Therefore, the path creation subsystem can ask repository to return all the information about a given function/node, which is represented as a graph. The path creation subsystem can then replace the single node with a graph representing what is happening inside the function.

In one embodiment, the analyzer includes:

A basic framework for pluggable different processes.

Plugin applications and/or verification/analysis tools with specific analysis algorithms.

A flow graph walking subsystem, which can start at any point and traverses through the execution path forward and/or backwards. The subsystem can on demand call the repository to expand flow graph traversed along function calls for more detailed analysis.

A pattern recognition subsystem (e.g., Rule Wizard™) capable to detect rule violations (patterns) along traversed execution path in either direction.

A path validation subsystem that is capable of validating whether a given path can be actually executed. This subsystem utilizes user hints, symbolic execution, recorded paths from actual software executions, as well as, other possible sources of information. For example "if (a>100) {do X}; if (a<0) {do Y}"—a path on which "do X" and "do Y" are simultaneously situated cannot be executed because a cannot be at the same time less then 0 and greater then 100.

A control User Interface (UI) 118 drives the scanning and analysis processes. The UI 118 also provides configuration for which rules to use, how large the paths need to be, place limit on the maximum time spent on the analysis, and the like. A presentation UI 116 presents analysis results to the users.

Additionally, FIG. 1 presents an exemplary notion of breaking larger execution units, like files 120 with source code, into smaller parts, like methods and functions 124 and 126. Each such entity is then converted into control flow graph 130. Each element of control flow graph, which contains execution statements and variables 132, has a created corresponding data flow graph 134.

Figure 2:
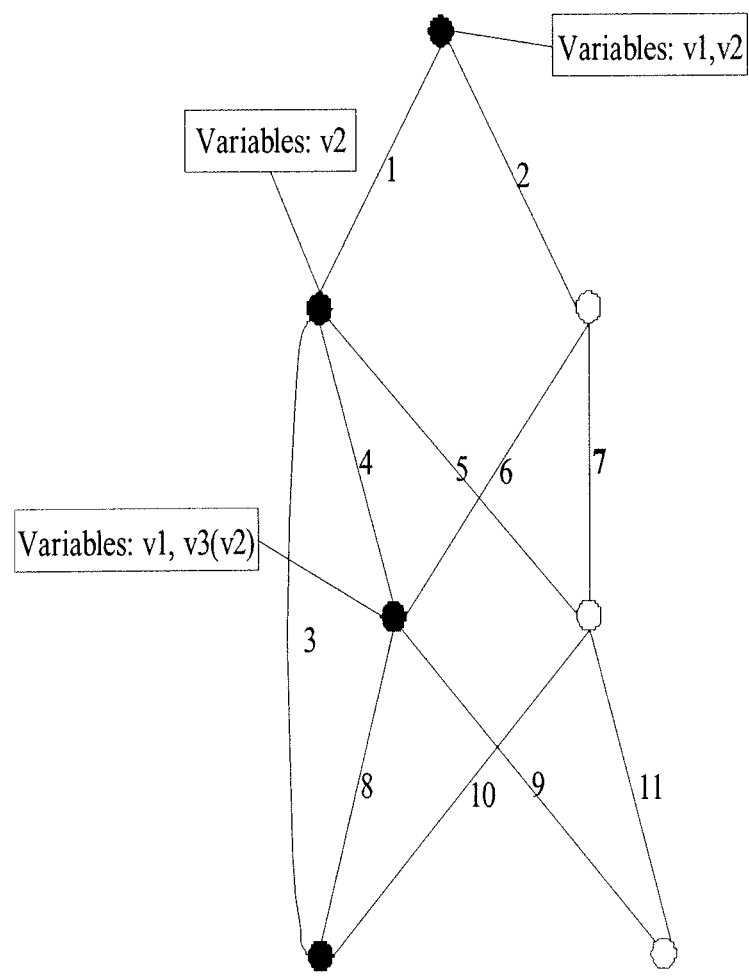
FIG. 2 is an example of how new paths can be obtained from a recorded path, according to one embodiment of the present invention.

FIG. 2 is an example of how new paths can be obtained from a recorded path. A path can be represented as nodes and lines. Each node is a decision point. Each line connecting nodes is a flow of execution path, where no decision is taken. Decisions are based on a state of the application at the moment when execution comes to the given decision node (point). All paths through the system comprise of circles and lines, starting from the top to the bottom. In this simplified example they are: (1,3), (1,4,8), (1,4,9), (1,5,10), (1,5,11), (2,6,8), (2,6,9), (2,7,10) and (2,7,11)—9 in total. In this example, it is assumed that a recorded path is (1,4,8), that is, the path which was actually executed during the application execution.

On this executed path, there are 3 decision points—(1,2), (3,4,5) and (8,9). Let's assume that perturbing first decision point would lead to the path (2,6,8). The invention analyzes this path but does not try to extend it by trying out to modify other decision nodes. Then, the invention perturbs the second decision node that leads to the paths (1,3) and (1,5,10). Perturbing the third decision node leads to the path (1,4,9). In such case, four new paths are to be analyzed and four other paths are not to be analyzed) because other decision points were not modified).

With a more complex software program, the number of paths skipped in comparison with those analyzed significantly grows. In such case, analysis of the remaining paths can be much more thorough than if the system was analyzing all potentially possible paths. Perturbation to the original path at the given decision point can be achieved by analyzing the condition(s) that governs the decision node. For example, the statement "if (a<5)" takes different path, if a=5, than when a=4. In some embodiments, for static analysis only, the invention assumes that a<5 and carries on with the analysis. However, if later, there is another condition, (for example, if a>10), the invention selects only one path, since a cannot be at the same time less than 5 and greater than 10 (i.e., mutually exclusive).

After the path is analyzed, the invention returns to the perturbed decision point and takes a second path, assuming that a>=5. For the purpose of unit test generation, the task becomes more complicated because, the actual value of a at the decision point is a result of the computation and initial conditions at the beginning of unit test case generation. In some embodiments, the invention modifies starting conditions and performs the computations in such a way that desired value of a is achieved at the decision point. Another possible method is to insert one or more assignment statements prior to the decision point to set a to the desired value, and then use the above-mentioned first method only if newly generated path reveals any problems. This way, the invention can rule out computation intensive activities for the paths that do not lead to any problem.

To generate unit test cases (rather than performing only static analysis), the invention manipulates the input data. For example, as shown in FIG. 2, a first decision point is governed by variable v1 and v2, a second decision point is governed by variable v2, and a third decision point is governed by v1 and v3, which depends on v2. Therefore, in this example, decision points are not completely independent and some of the selected paths may not be effectively executed.

Variables values can be manipulated by changing values of the system variables inside unit test case. In some embodiments, the invention can directly set appropriate value to the variable in the test case. Often, there is an indirect dependency between starting variables and the one governing decision point y=f(x1, x2, . . . xN), where y is variable at the decision point and x1 to xN are variables which can be set as starting conditions in unit test case. If desired value of y is Y, then following equation is solved using known methods:

$$f(x1, x2, \ldots, xN) - Y = 0 \qquad \text{Eq. (1)}$$

Figure 3:
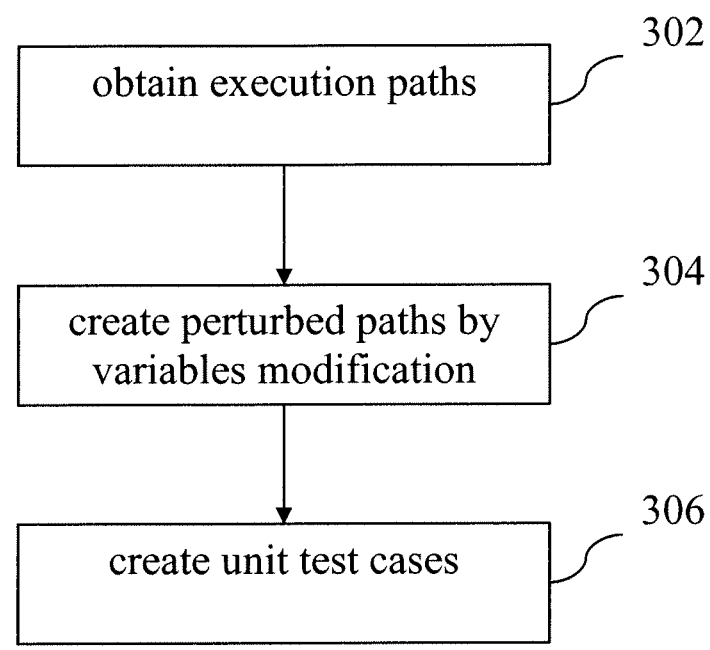
FIG. 3 is an exemplary simplified process for creating unit test cases, according to some embodiments of the present invention.

FIG. 3 is an exemplary simplified process for creating test cases, according to some embodiments of the present invention. In block 302, one or more execution path(s) are obtained, for example, the paths extracted from a running application (based on the execution of the application). These paths represent true execution of a program driven by real life situations or by tests performed on an application. At a given decision node, certain variables are examined, and depending on their values a given path is taken.

Having a given path, the invention can slightly perturb it by changing some variable(s), for example, by changing initial values for the test case, so different decision is made in one of the decision points, as shown in block 304. As a result, based on a different decision point, a different path is created.

Depending on the nature of the code, the new path may be completely different, or slightly different from the original path. The assumption in this example is that the new path is created by a small change in one (or limited number of) decision nodes. One or more unit tests are then generated using variable values recorded with the recorded execution paths.

Having a given recorded path, the invention creates one or more unit test case(s) which reproduce(s) that path. The recorded path information include, not only information about which lines were executed, but also, information about which variable has what value at a given path stage. Moreover, an event occurrence can be simulated with a test case which calls one or more appropriate function(s) (event handler) with the appropriate data. Such unit test case therefore causes same path (piece of code) to be executed.

Execution of a path usually starts from input operation when user initiates an action form a user interface, or when some event occurs, which initializes application action. The path then continues throughout the system until all required actions (decided by the user) are completed. Unit test cases can emulate user action from the UI. All objects being part of the system and referenced during the path execution are initialized with the recorded values. Then, variables reading user input are set with the data entered by the user.

Alternatively, if an event was originating/instantiating the path, unit test cases provide data associated with the event. For example, if the event was related to an arrived message, an appropriate message is delivered. If the event was indicating that some data is ready to be read from the stream, the unit test case framework prepares one or more stream stubs, which deliver required data.

Figure 4:
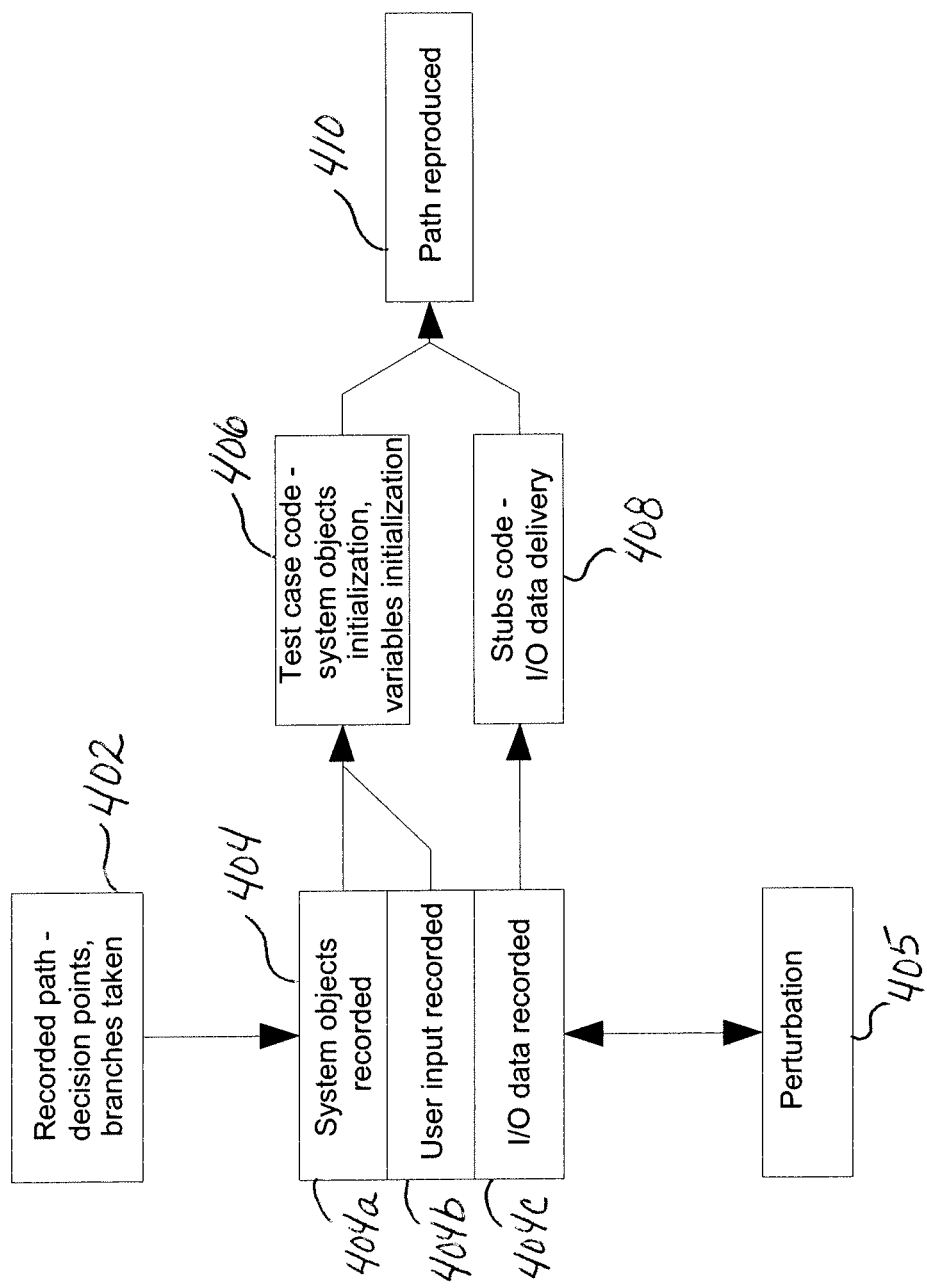
FIG. 4 is an exemplary basic process for generating unit test cases based on perturbed recorded paths, according to some embodiments of the present invention.

FIG. 4 is an exemplary process flow for generating unit test cases based on perturbed recorded paths, according to some embodiments of the invention. As shown in FIG. 4, recorded paths in block 402 and recorded data in block 402, such as, recorded system objects, user input 404b, and I/O data 404c can be slightly modified by a perturbation process 405. In block 406, test cases are created based on user input 404b, and the state of the program at the time when path was started 404a. In block 408, stubs are created to simulate I/O operations with the perturbed data. As a result, a perturbed path is reproduced in block 410. The perturbed path is then analyzed to detect any potential errors. Unit tests are then generated for the perturbed path, which has the detected potential error(s). The generated unit test can then be saved, used, or modified to test the particular paths, without having to test all the numerous potential paths.

Figure 6:
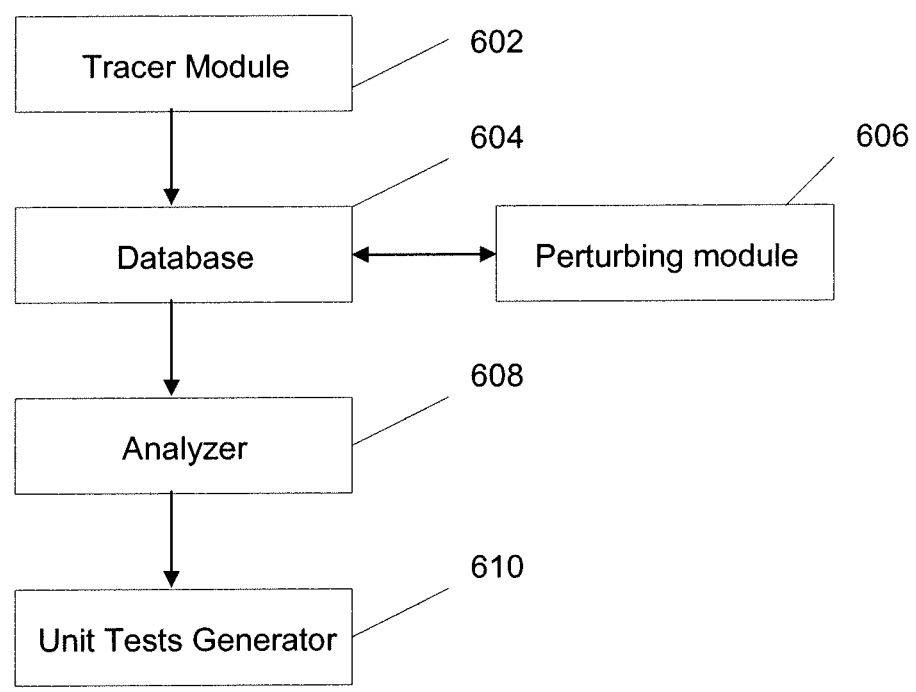
FIG. 6 is a block diagram of an exemplary system for generating unit test cases based on perturbed recorded paths, according to some embodiments of the invention.

FIG. 6 is a block diagram of an exemplary system for generating unit test cases based on perturbed recorded paths, according to some embodiments of the invention. A tracer module 602 executes the computer program to obtain an (one or more) execution path in the computer software and a database 604 records the (one or more) execution path. A perturbing module 606 modifies variables in the recorded execution path to create one or more perturbed paths. An analyzer 608 analyzes the (one or more) perturbed path to detect potential errors. A unit test generator 610 then automatically generates unit tests for the (one or more) perturbed path having the detected potential errors.

Figure 5:
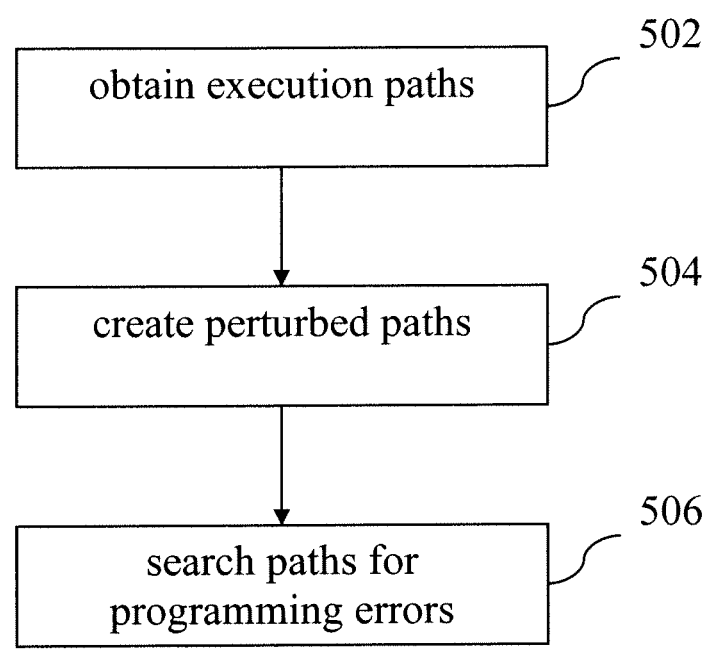
FIG. 5 is an exemplary process flow for static analysis of a computer program using execution paths, according to some embodiments of the invention.

FIG. 5 is an exemplary process flow for static analysis of a computer program using execution paths, according to some embodiments of the invention. In this embodiment, one or more execution paths are obtained from executing static analysis test on the computer program, as shown in block 502. This path represents true execution of a program in a real situation, either driven by real life situation or by test performed on an application. At a given decision node, certain variables are examined, and depending on their values a given path is taken. Having a given path one can perturb it by changing slightly some variable, so different decision is made in one of the decision points. As a result different paths are created, as shown in block 504. Depending on the nature of the computer program, the new path can either be completely different, or differ only slightly from the original path. In this case the new path is created as a result of static analysis using among others, data and execution flow analysis execution simulation. Created path is then analyzed in the search of unwanted or unexpected behavior, either representing coding error or logical error.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for testing a computer software system based on execution paths, the method comprising:

executing a computer program to obtain an original execution paths of the computer program;

recording the original execution paths;

selecting a first decision point on an executed path from the recorded original execution paths;

analyzing conditions that govern the selected first decision point and subsequent decision points along a first path to detect mutually exclusive conditions along the first path;

modifying one or more variables in the selected first decision point, taking into account the detected mutually exclusive conditions, to generate a new first perturbed logical path, the new perturbed first logical path not being part of the original execution path and having a high execution probability according to the modification of the one or more variables;

analyzing the first perturbed logical path starting from said first decision point to detect potential errors in said first perturbed logical path;

selecting a second decision point on said executed path;

analyzing conditions that govern the selected second decision point and subsequent decision points along a second path to detect mutually exclusive conditions along the second path;

modifying one or more variables in the selected second decision point, taking into account the detected mutually exclusive conditions, to generate a new second perturbed logical path, the second perturbed new logical path having a high execution probability according to the modification of the one or more variables in the selected second decision point;

analyzing the second perturbed logical paths starting from said second decision point to detect potential errors in said second perturbed logical path; and automatically generating unit tests for the first and second perturbed logical paths having the detected potential errors by using variables and their values in the first and second perturbed logical paths and taking into account the detected mutually exclusive conditions at the first and second decision points, wherein modifying one or more variables in the selected first decision point comprises solving the following equation:

$f(x_1, x_2, \ldots, x_N) - Y = 0$, where $x_1$ to $x_N$ are starting variables that are set to generate said new perturbed logical paths and Y is a desired value of a variable governing the decision point.

2. The method of claim 1, wherein recorded execution path information include information about which lines in the computer software were executed and information about variable values at a given path stage.

3. The method of claim 1, further comprising executing the generated test units to test the computer software.

4. The method of claim 1, further comprising applying a pattern recognition analysis to the first and second perturbed paths using a set of pattern recognition rules.

5. The method of claim 1, further comprising expanding graphs along function invocations of the recorded first execution path to obtain an elementary path from the recorded first execution path.

6. The method of claim 1, wherein analyzing the first and second perturbed paths further comprises starting at any point in a perturbed path and traversing in a forward or backwards direction through a corresponding execution path.

7. The method of claim 1, further comprising expanding a flow graph traversed along function calls for more detailed analysis.

8. The method of claim 6, further comprising detecting rule violations along the corresponding execution path in the forward or backwards direction.

9. The method of claim 6, further comprising validating whether a given path can be actually executed utilizing a user input.

10. The method of claim 6, further comprising validating whether a given path can be actually executed utilizing symbolic execution and recorded paths from execution of the computer program.

* * * * *

UNITED STATES PATENT AND TRADEMARK OFFICE
CERTIFICATE OF CORRECTION

PATENT NO.         : 8,732,676 B1
APPLICATION NO.    : 12/202009
DATED              : May 20, 2014
INVENTOR(S)        : Adam K. Kolawa et al.

It is certified that error appears in the above-identified patent and that said Letters Patent is hereby corrected as shown below:

In the Claims

Col. 8, line 27, Claim 1    Delete "obtain an original",
                            Insert --obtain original--

Col. 9, line 6, Claim 2     Delete "include",
                            Insert --includes--

Signed and Sealed this
Thirty-first Day of March, 2015

Michelle K. Lee
*Director of the United States Patent and Trademark Office*